United States Patent
Triebes et al.

(10) Patent No.: US 6,850,409 B1
(45) Date of Patent: Feb. 1, 2005

(54) SHIM ASSEMBLY FOR HARDWARE MODULE

(75) Inventors: Karl Douglas Triebes, Santa Clara, CA (US); Michael Donald Greenslade, San Leandro, CA (US); A. Fred Hendrix, Salida, CA (US)

(73) Assignee: Foundry Networks, Inc., San Jose, CA (US)

( * ) Notice: Subject to any disclaimer, the term of this patent is extended or adjusted under 35 U.S.C. 154(b) by 0 days.

(21) Appl. No.: 10/351,003

(22) Filed: Jan. 25, 2003

(51) Int. Cl.⁷ ................................................. G06F 1/16
(52) U.S. Cl. ................... 361/684; 361/685; 361/810; 361/686; 211/41.11; 439/64; 439/61
(58) Field of Search ....................... 361/684, 802, 361/810, 825, 685, 686, 729, 741, 748, 760, 756; 439/61, 64; 211/41.11

(56) References Cited

U.S. PATENT DOCUMENTS 4,784,609 A * 11/1988 Lau .............................. 439/56
6,166,917 A * 12/2000 Anderson .................... 361/756

* cited by examiner

Primary Examiner—Kamand Cuneo
Assistant Examiner—Hung S. Bui
(74) Attorney, Agent, or Firm—Brown Raysman Millstein Felder & Steiner LLP

(57) ABSTRACT

The present invention comprises a shim assembly for supporting a hardware module flush with a bottom side of a printed circuit board. A bottom side of the shim assembly is attached to a top side of the printed circuit board and generally conforms to the shape of a slot in the printed circuit board into which the hardware module is inserted. The shim assembly is of sufficient thickness to fill a gap between the hardware module and the top side of the printed circuit board such that the hardware module does not materially extend past a bottom side of the printed circuit board when inserted in the slot.

24 Claims, 11 Drawing Sheets

SHIM ASSEMBLY FOR HARDWARE MODULE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to support structures within electronic devices. More particularly, the present invention relates to a shim assembly for supporting removable hardware modules inserted into a printed circuit board.

Printed circuit boards used in electronic devices are configured to accept other components or modules in addition to a microprocessor. For example, the logic boards found in most modern computers comprise an expansion bus to which printed circuit cards may be attached, thereby expanding the functionality of the device. Similarly, certain computing devices are configured to allow for expansion of the device's functionality through the use of hardware modules that are attached or otherwise inserted into the device where they couple to the circuitry within the device, thereby providing communication between the module and device.

FIG. 1 presents an exemplary hardware module, in this case a Xenpak swappable optical transceiver, inserted into a printed circuit board. The printed circuit board 102, of which a bottom view is illustrated, is attached to a chassis 104. The chassis 104 and printed circuit board 102 are inserted into a housing (not pictured) that provides means for the printed circuit board to communication with other hardware components. The printed circuit board 102 has a slot into which a swappable hardware module 106 is inserted, e.g., a Xenpak optical transceiver. Unfortunately, the hardware module 106 hangs below the bottom side of the printed circuit board 102 when inserted into the slot.

As can be seen in FIG. 1, when inserted into the chassis 104 two edges 108 and 110 of the bottom side of the hardware module 106 do not lie flush with the bottom of the printed circuit board 102. When the printed circuit board is inserted into another electronic device, such as a chassis that accepts other printed circuit boards that provide electronic communication via a swappable hardware module, the hardware module potentially comes into contact with adjacent printed circuit boards, thereby damaging or otherwise interfering with them. Furthermore, because of its size and orientation, the hardware module 106 protrudes beyond the bottom of its slot outside the chassis 104. Simply raising the hardware module 106 within the chassis 104 results in inadequate support of the hardware module 106 vis-à-vis the printed circuit board 102, which similarly tends to result in potentially significant damage to circuitry on the printed circuit board 102 or to the hardware module itself 106.

Thus, a solution is required that provides support for a hardware module when inserted within an electronic device. More specifically, the required solution supports the hardware module to prevent it from materially extending past a bottom side of the printed circuit board. By preventing the hardware module from materially extending past a bottom side of the printed circuit board, the solution of the present invention, prevents damage of other circuitry or components located near the bottom side of the printed circuit board, such as other, adjacent printed circuit boards installed in a common chassis. Additionally, this solution provides for unimpeded adequate airflow across the bottom of the printed circuit board.

BRIEF SUMMARY OF THE INVENTION

The shim assembly of the present invention provides a mechanism for supporting a hardware module inserted into a slot in a printed circuit board configured to receive the hardware module. According to one embodiment, the invention comprises a shim assembly for supporting a hardware module. A bottom side of the shim assembly is attached to a top side of the printed circuit board and generally conforms to the shape of a slot in the printed circuit board into which the hardware module may be inserted. Advantageously, the shim assembly is sufficiently thick to fill a gap between the hardware module and the top side of the printed circuit board such that the hardware module does not materially extend past a bottom side of the printed circuit board when inserted in the slot. Where the hardware module materially extends past the bottom side of the printed circuit board, other circuitry or components located on or near the bottom side of the printed circuit board may potentially be damaged, or adequate airflow across the bottom of the printed circuit board may be impeded. Similarly, failure to adequately support the module may result in damage to the printed circuit board itself.

Connecting means are used to attach the shim assembly to the printed circuit board. The connecting means may comprise any number of means well known to those of skill in the art, such as an adhesive, one or more screws, rivets, bolts, etc. The shim assembly is preferably constructed of a conductive material to provide proper grounding.

To allow the hardware module to connect to the printed circuit board, a socket is attached to a top side of the shim assembly. Preferably, the socket is positioned such that an electrical interface on the hardware module is aligned with the socket. The socket comprises electrical circuitry that is connected to a circuit on the printed circuit board. The socket, along with the electrical circuitry, provides a communication pathway for electrical signals to pass from the hardware module to a circuit on the printed circuit board via the socket.

According to an alternative embodiment of the invention, a printed circuit board is provided that comprises a plurality of slots, each slot configured to accepts a hardware module. A plurality of shim assemblies are also provided, a bottom side of a given shim assembly attached to the printed circuit board and generally conforming to the shape of a given slot in the printed circuit board into which a hardware module may be inserted. Each of the plurality shim assemblies is sufficiently thick to fill a gap between a given hardware module and a top side of the printed circuit board such that the given hardware module does not extend past a bottom side of the printed circuit board when inserted in a given slot.

Each of the plurality of shim assemblies may be of a disparate thickness. In this manner, each of the plurality of shim assemblies is configured to be sufficiently thick to fill a gap between a given hardware module and the printed circuit board such that the given hardware module does not extend past a bottom side of the printed circuit board when inserted in a given slot. The plurality of shim assemblies may also comprise a plurality of sockets; a given one of the sockets attached to a top side of a given one of the plurality shim assemblies. Each of the plurality of sockets is preferably positioned such that an electrical interface on a given hardware module is aligned with a given socket.

A further embodiment of the invention contemplates a shim assembly for supporting a hardware module, the shim assembly being attached to a top side of a printed circuit board. The printed circuit board has a slot with an opening located along a first side of the printed circuit board, the slot configured to receive a hardware module. The shim assembly comprises a first rail and a second rail attached to the top of the printed circuit board along a first and second side of the slot, respectively, each side perpendicular to the opening. A daughtercard is also attached to the top of the printed circuit board along a side of the slot that is parallel to the opening. The first rail, second rail and daughtercard are of a sufficient thickness to support a hardware module inserted into the slot on the printed circuit board such that the hardware module does not extend past a bottom side of the printed circuit board when inserted in the slot.

A socket may be attached to the daughtercard on a side of the daughtercard that is opposite to the side attached to the printed circuit board wherein the socket is positioned such that an electrical interface on the hardware module is aligned with the socket. The socket may comprise electrical circuitry in connection with a circuit on the printed circuit board to provide a communication pathway for an electrical signal to pass from the hardware module to a circuit on the printed circuit board via the socket.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
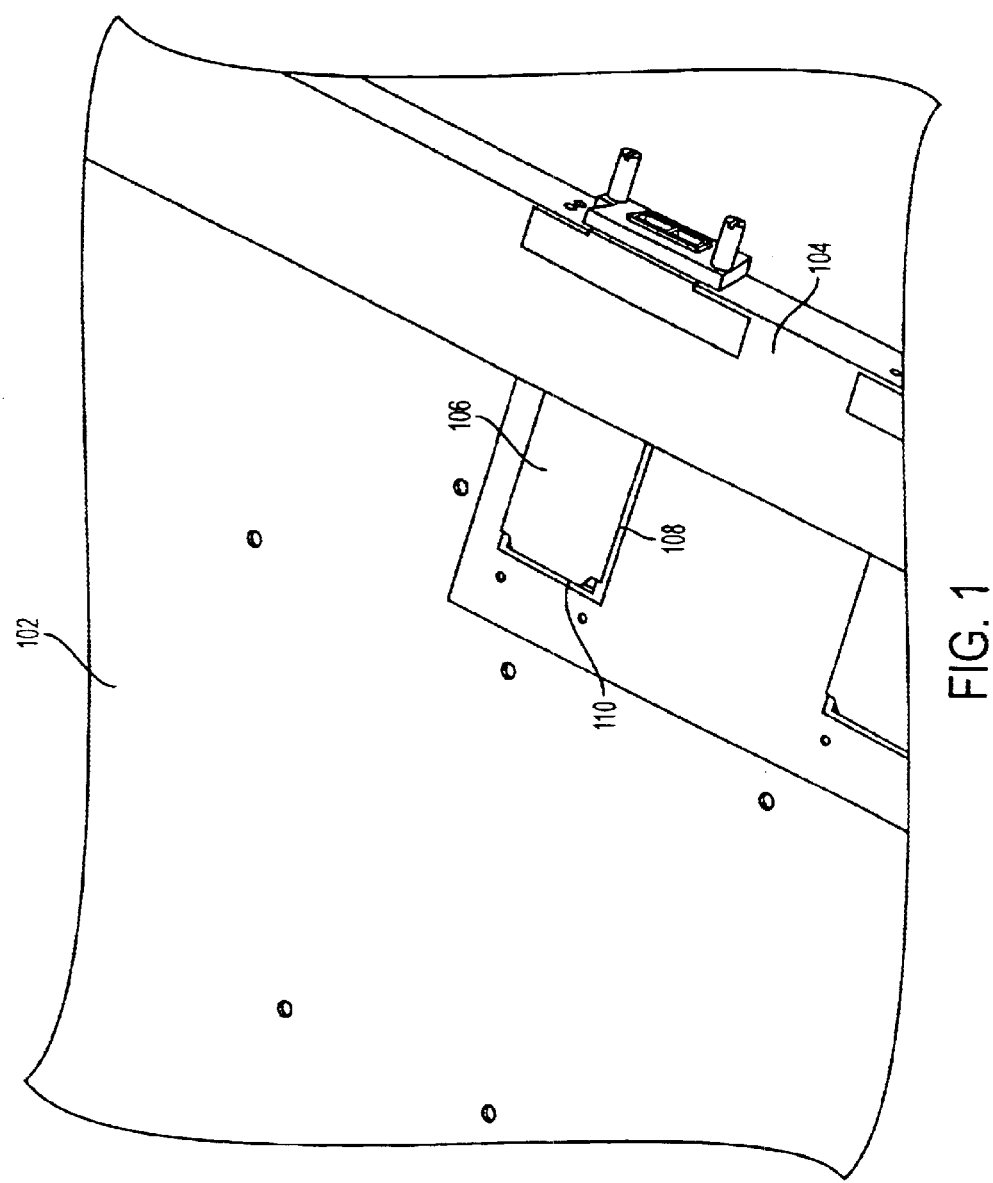
FIG. 1 is a bottom view of an inadequately supported Xenpak module inserted into a slot in a printed circuit board.
Figure 2:
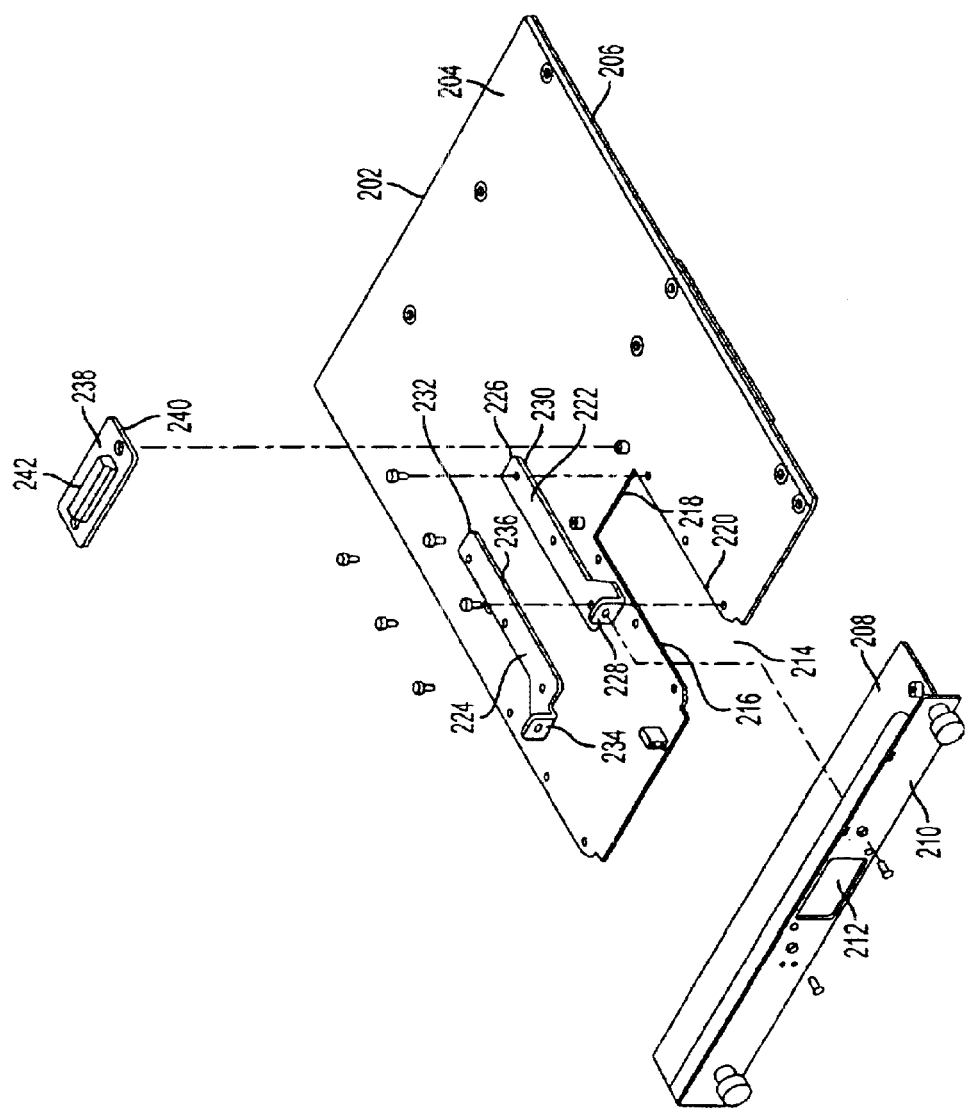
FIG. 2 is an exploded perspective view of a shim assembly for supporting a hardware module according to one embodiment of the present invention.

With reference to FIGS. 2 through 11, embodiments of the invention are presented. FIG. 2 presents one configuration of a shim assembly for supporting a removable or swappable hardware module, e.g., a network connectivity device such as a Xenpak swappable optical transceiver, within an electronic device. An electronic device as contemplated by the present invention includes a printed circuit board 202. Arranged in various positions around the top 204 of the printed circuit board 202 are a number of electronic components (not pictured). The electrical components include leads that pass through the top 204 of the printed circuit board 202 where the are soldered to electrical pathways running along the bottom of the board. The side 206 of the printed circuit board 202 is sufficiently thick to allow the leads to generally terminate at the bottom of the board.

On one side of the printed circuit board 202 is a slot 214 for accepting a removable or swappable hardware module (not pictured). The sides 216 and 220 of the slot 214 are generally equal in length to that of the hardware module. Similarly, the inner edge 218 of the slot 214 is of a sufficient width to accommodate the hardware module within the slot. As will be explained in greater detail, the shim assembly of the present invention may be configured to support a hardware module with a width that is smaller that the length of the inner edge 218 of the slot 214. A chassis 208 has an opening 212 along its front edge 210, which is generally perpendicular to the printed circuit board 202 and forms an edge of the slot 214 that is distal from the inner edge 218. The height and width of the opening 212 is sufficiently large to accommodate insertion of the hardware module.

In accordance with the invention, the shim assembly, including side rail 222, side rail 224 and daughtercard 238, is attached to the top side 204 of the printed circuit board 202 along the edges 216, 218 and 220 of the slot 214. The shim assembly is attached to the printed circuit board 202 according to techniques well know to those of skill in the art, such as through the use of an adhesive, screws, bolts, rivets, etc. The shim assembly consists of two side rails 222 and 224. Each rail 222 and 224 has front and back edges 226, 228, 232 and 234, respectively, which provide each rail with a length equal to that of the left 216 and right 220 sides of the slot 214. Alternatively, each rail 222 and 224 may be broken into a plurality of smaller rail structures attached to the printed circuit board 202 in a manner generally analogous to that of each rail 222 and 224.

The side edge 230 and 236 of each rail 222 and 224 is of sufficient thickness to support the hardware module so that it does not materially extend past the bottom of the printed circuit board 202 or lies flush with the bottom of the printed circuit board 202. For example, where a one-quarter inch gap exists between the hardware module and the top of the printed circuit board, each rail is one-quarter inch thick. The hardware module is considered to materially extend past the bottom of the printed circuit board where the hardware module potentially comes into contact with or may damage other circuitry residing on or near the bottom side of the printed circuit board, or extends past the bottom of the printed circuit board to thereby prevent adequate air flow over the bottom of the printed circuit board. The shim assembly is preferably constructed from a conductive material, although other suitable materials are well known to those of skill in the art and are contemplated as falling within the scope of the present invention.

Attached to the printed circuit board 202 along the inner edge 218 of the slot is a daughtercard 238, which has a socket 242 to which an electrical interface on the hardware module is inserted. The edge 240 of the daughtercard 238, like the edge of the side rails 222 and 224 of the shim assembly, is of sufficient thickness to support the hardware module flush with the bottom of the printed circuit board 202, or such that it does not materially extend past the bottom side of the printed circuit board. The edge 240 of the daughtercard 238 is also of sufficient thickness to raise the socket 242 to allow an electrical interface on the hardware module to be inserted into the socket 242. For example where the electrical interface on the hardware module is raised one quarter-inch above the top side of the printed circuit board, the daughtercard is of sufficient thickness to raise the socket one quarter-inch above the top side 204 of the printed circuit board 202.

Leads typically extend from the socket 242 through the daughtercard 238 where they are in contact with circuitry on the top 204 of the printed circuit board 202 to provide a communications path from the hardware module to other circuitry on the printed circuit board 202. According to one embodiment, the shim assembly 222, 224 and 238 is shaped so as to generally conform to the edges 216, 218 and 220 of the slot 214 and provide uniform support for the hardware module. Alternatively, the side rails 222 and 224 are shorter or longer in length than the sides 216 and 220 of the slot 214, or extend over the sides of the slot where the width of the hardware module is smaller than that of the inner edge 218 of the slot 214. Similarly, the daughtercard 238 may be shorter in length than the inner edge 218 of the slot 214.

Figure 3:
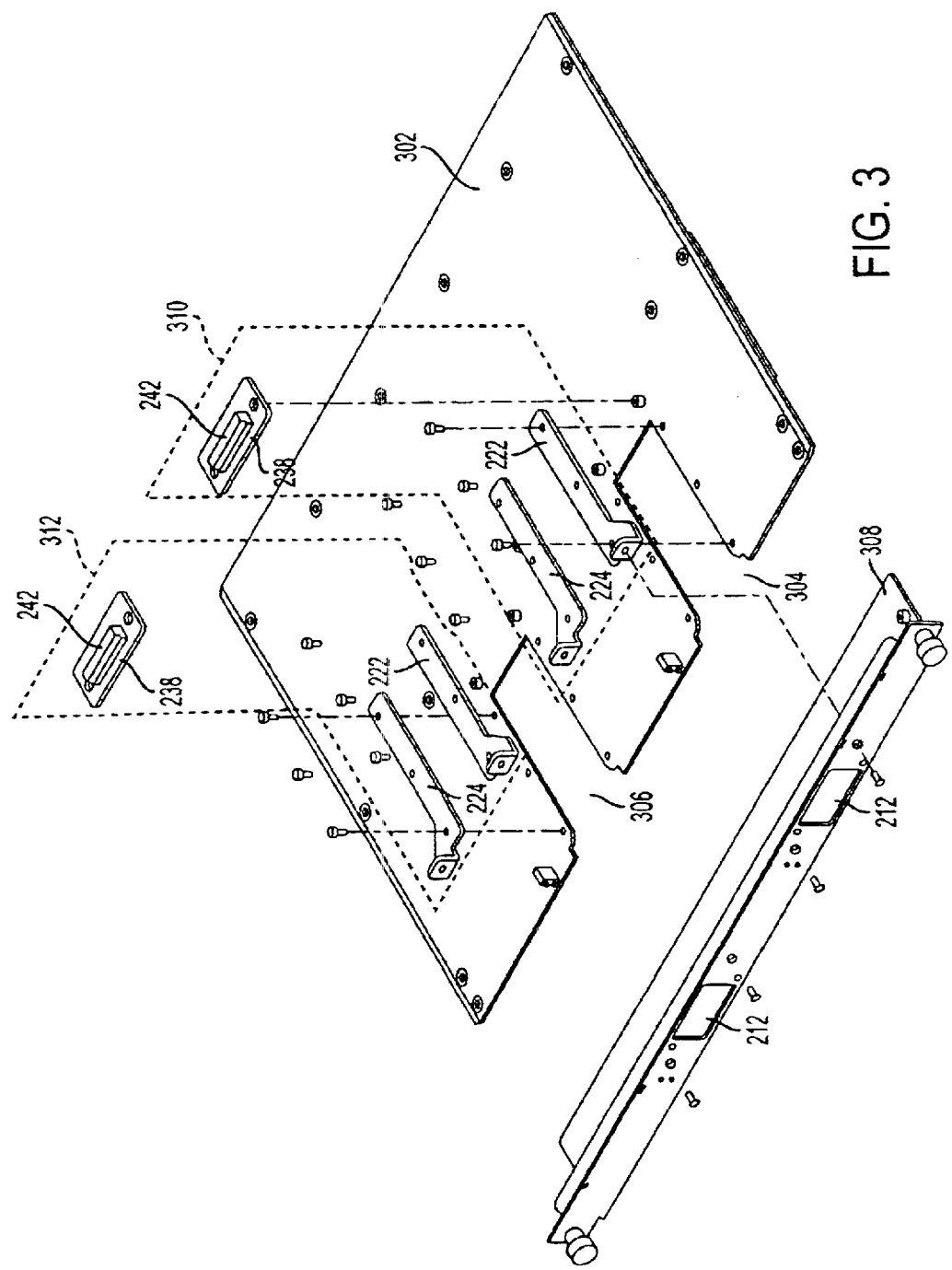
FIG. 3 is an exploded perspective view of multiple shim assemblies for supporting hardware modules according to an alternative embodiment of the present invention.

Building on the illustration presented in FIG. 2, FIG. 3 presents a printed circuit board 302 with a plurality of slots 304 and 306, each slot configured to accept a hardware module (not pictured). To accommodate multiple hardware modules, the chassis 308 has a plurality of openings 212, each opening aligned with a corresponding slot 304 and 306 on the printed circuit board 302. Each slot 304 and 306 is provided with a shim assembly 310 and 312, including a first side rail 222, a second side rail 224 and a daughtercard 238, to support a hardware module inserted into a slot, 304 and 306, flush with the bottom of the printed circuit board 302. The daughtercard 238 on each shim assembly 310 and 312 positions a socket 242 to accommodate a connection between the socket 242 and an electrical interface on the hardware module.

According to an embodiment of the invention, each of the plurality of shim assemblies 310 and 312 are configured to support disparate hardware modules flush with a bottom side of the printed circuit board 302, or prevent the hardware modules from materially extending beyond the bottom side of the printed circuit board 302. For example, a first one of the plurality of shim assemblies 310 is of sufficient thickness to support a hardware module of a first configuration flush with the bottom of the printed circuit board, whereas the thickness of a second one of the plurality of shim assemblies 312 is of sufficient thickness to support a hardware module of a second configuration flush with the bottom of the printed circuit board 302. To clarify by further example, where a one-quarter inch gap forms between a first hardware module and the printed circuit board, the first shim assembly would be one-quarter inch thick. Similarly, where a one half-inch gap forms between a second hardware module and the printed circuit board, the second shim assembly would be one half-inch thick. In this manner, disparate shim assemblies are attached to the printed circuit board 302 to support multiple types of hardware modules.

Figure 4:
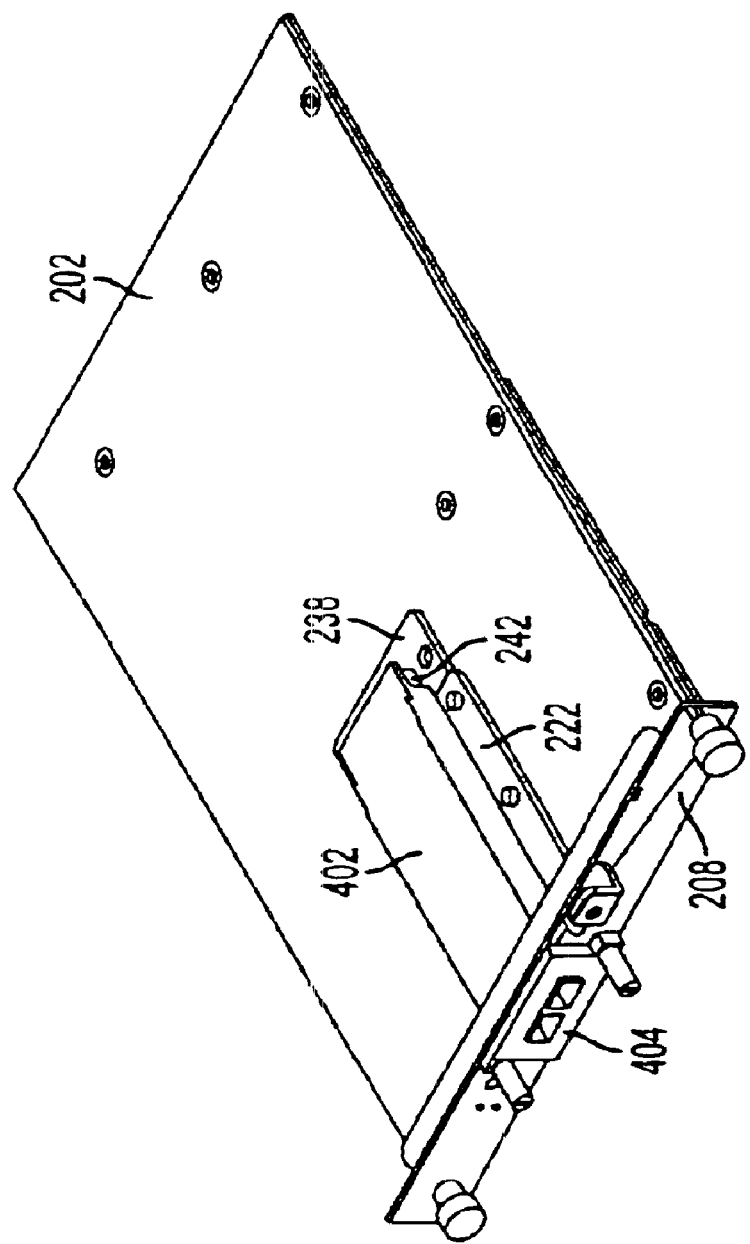
FIGS. 4, 5 and 6 present a series of top perspective views of a hardware module supported by a shim assembly according to one embodiment of the present invention.
Figure 5:
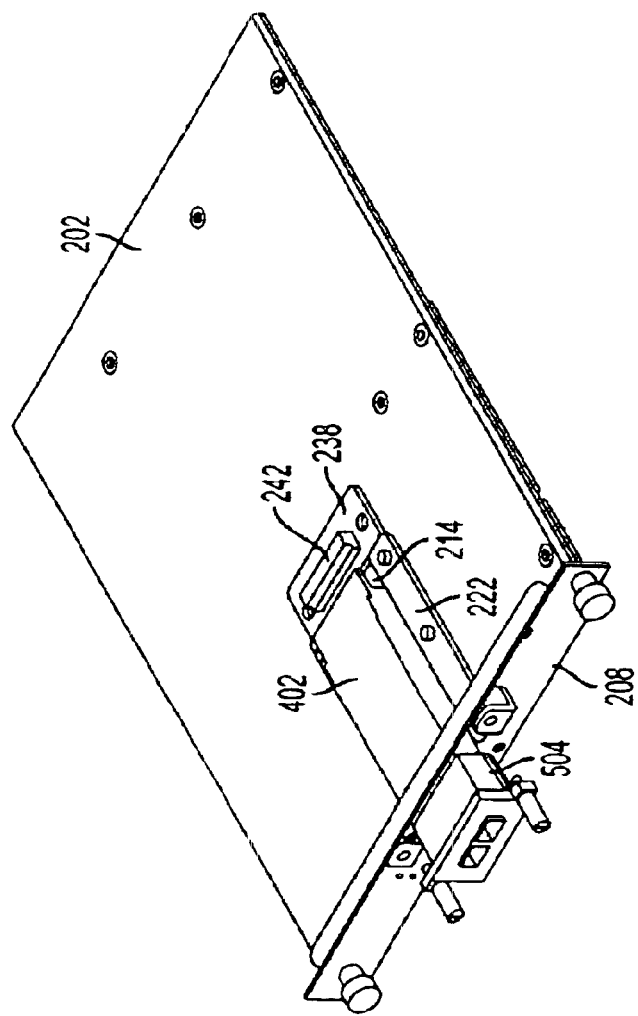
Figure 6:
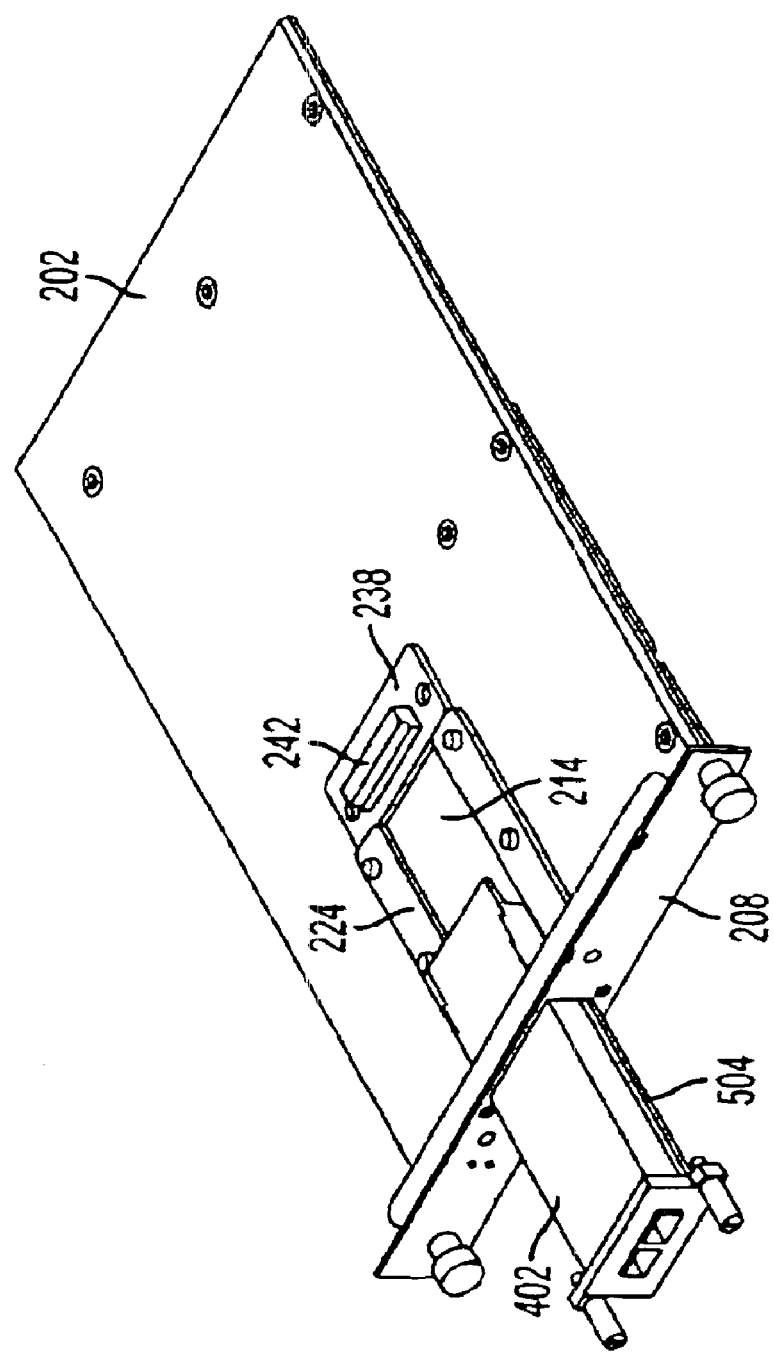

FIGS. 4, 5 and 6 present a series of top perspective views of a hardware module supported by a shim assembly in various stages of insertion into the slot in the printed circuit board as illustrated in FIGS. 2 and 3. The perspective view of FIG. 4 presents a printed circuit board 202 attached to a chassis 108. According to one embodiment, the chassis 208 supports or houses the printed circuit board 202, the printed circuit board electrically coupled to a housing comprising a plurality of printed circuit boards in communication over a backplane or similar bus structure. The housing's backplane provides communication circuitry that allows components on each of plurality of printed circuit boards to communicate. According to the view presented in FIGS. 4 and 5, the chassis 208 is presented as a cut away to illustrate a right rail of the shim 222. It will be noted by one of skill in the art that the chassis 208 is typically manufactured from an opaque material that obscures the shim 222 when viewed from the perspective of the front of the chassis 206 as presented in FIG. 6.

The shim assembly is partially visible in the view of FIG. 4. The left side rail of the assembly is obstructed by the hardware module 402, which is fully inserted into the slot in the printed circuit board 202 through the opening in the chassis 208. The hardware module 402 is visibly supported by both the right side rail 222 and daughtercard 238 of the shim assembly. As can be seen, the front edge 404 of the hardware module 402 lies flush with the chassis 208 when fully inserted into the slot on the printed circuit board 202 from the support and elevation that the shim provides 222 and 238. The daughtercard 238, in addition to supporting one edge of the hardware module 402, elevates the socket 242 to allow an electrical interface (not pictured) on the hardware module 402 to be securely inserted into the socket 242.

Continuing with FIG. 5, the hardware module is shown partially inserted into the slot 214 in the printed circuit board 202. Detachment of the hardware module 402 from the socket 242 reveals a notch 504 running along the lower edge of one side of the hardware module 402. The shim assembly is attached to the printed circuit board 202 to support the notch 504 resting securely on the shim assembly, e.g., the right side rail 222 and daughtercard 238, to thereby provide continuous support along the entire bottom edges of the hardware module 402 and allow the hardware module 402 to lie flush with the bottom of the printed circuit board 202.

As the hardware module 402 continues to be removed from the slot 214 in the printed circuit board 202 through the opening in the chassis 208, the remainder of the shim assembly comes in view, as illustrated in FIG. 6. The left side rail 224 of the shim assembly provides support for the left side of the hardware module 402. Although obscured from view, the lower left side of the hardware module 402 has an identical notch to the notch 504 on the lower right side of the hardware module 402, which meets with and is supported by the left side rail 224 of the shim assembly. The left side rail 224, right side rail 222 and daughtercard 238 provide continuous support along the bottom edges of the hardware module 402, e.g. the lower right edge 504. The shim assembly 222, 224 and 238 elevates an electrical interface on the hardware module 402 to allow it to interface with the socket 242 while remaining flush with the bottom of the printed circuit board 202.

Figure 7:
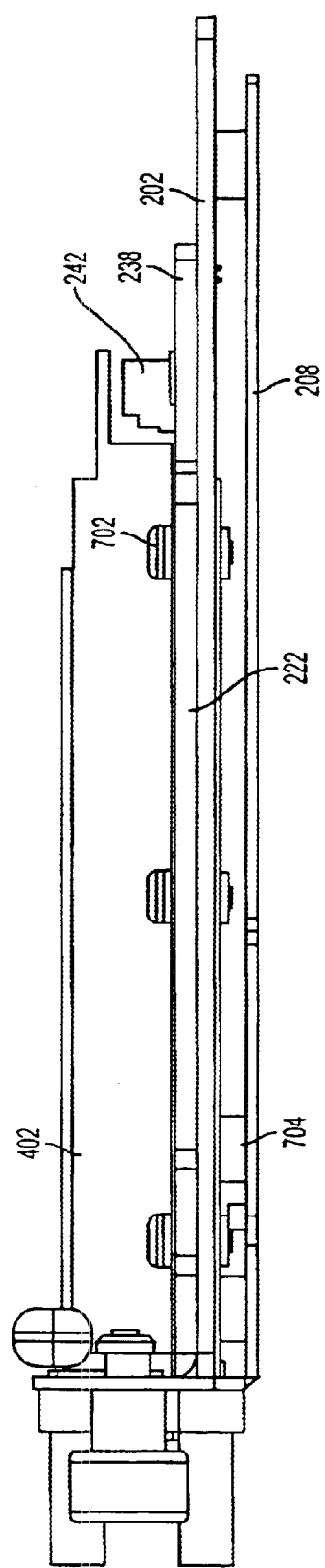
FIG. 7 is a cross section view of a hardware module supported by a shim assembly according to one embodiment of the present invention.

FIG. 7 presents a cross section view of the hardware module supported flush with the bottom of the printed circuit board by a shim assembly according to one embodiment of the present invention. The printed circuit board 202 provides a base or substrate to which the shim assembly is attached, in addition to providing support and electrical interconnections for other circuitry on the printed circuit board 202. The chassis 208 provides support for or housing of the printed circuit board 202, the chassis 208 used to insert the combination of the printed circuit board 202 and chassis 208 into an expansion bus of another computing device. While the printed circuit board 202 may be directly attached to the chassis 208, the present embodiment illustrates a series of posts 704 used to support the printed circuit board 202 and thereby prevent damage to any circuitry leads extending past the bottom of the printed circuit board 202.

The shim assembly, of which a cross section of the right side rail 222 and the daughtercard 238 is visible in the present view, is attached to the printed circuit board 202 using various techniques known to those of skill in the art. According to the present embodiment, the shim assembly 222 and 238 is attached to the printed circuit board 202 through the use of a plurality of screws 702, each screw 702 passing through the shim assembly and anchored on the bottom side of the printed circuit board 202. The configuration of the shim assembly elevates the hardware module 402 to a position that is flush with the bottom side of the printed circuit board 202. The daughtercard 238, in addition to supporting the hardware module 402, is of sufficient thickness to elevate the socket 242 and properly align it to accept an electrical interface (not pictured) on the hardware module 402.

Figure 8:
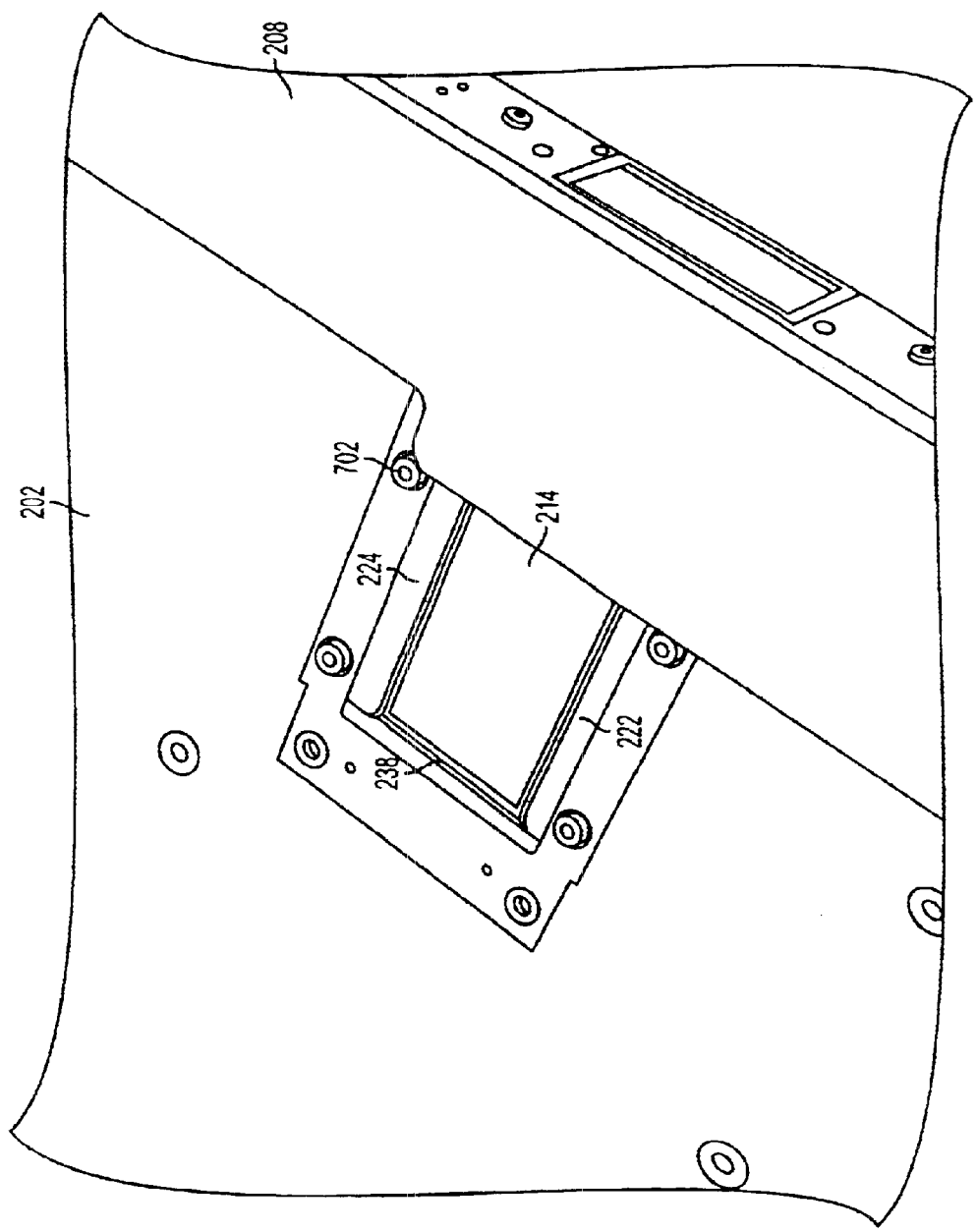
FIG. 8 is a bottom perspective view of a shim assembly for supporting a hardware module according to one embodiment of the present invention.
Figure 9:
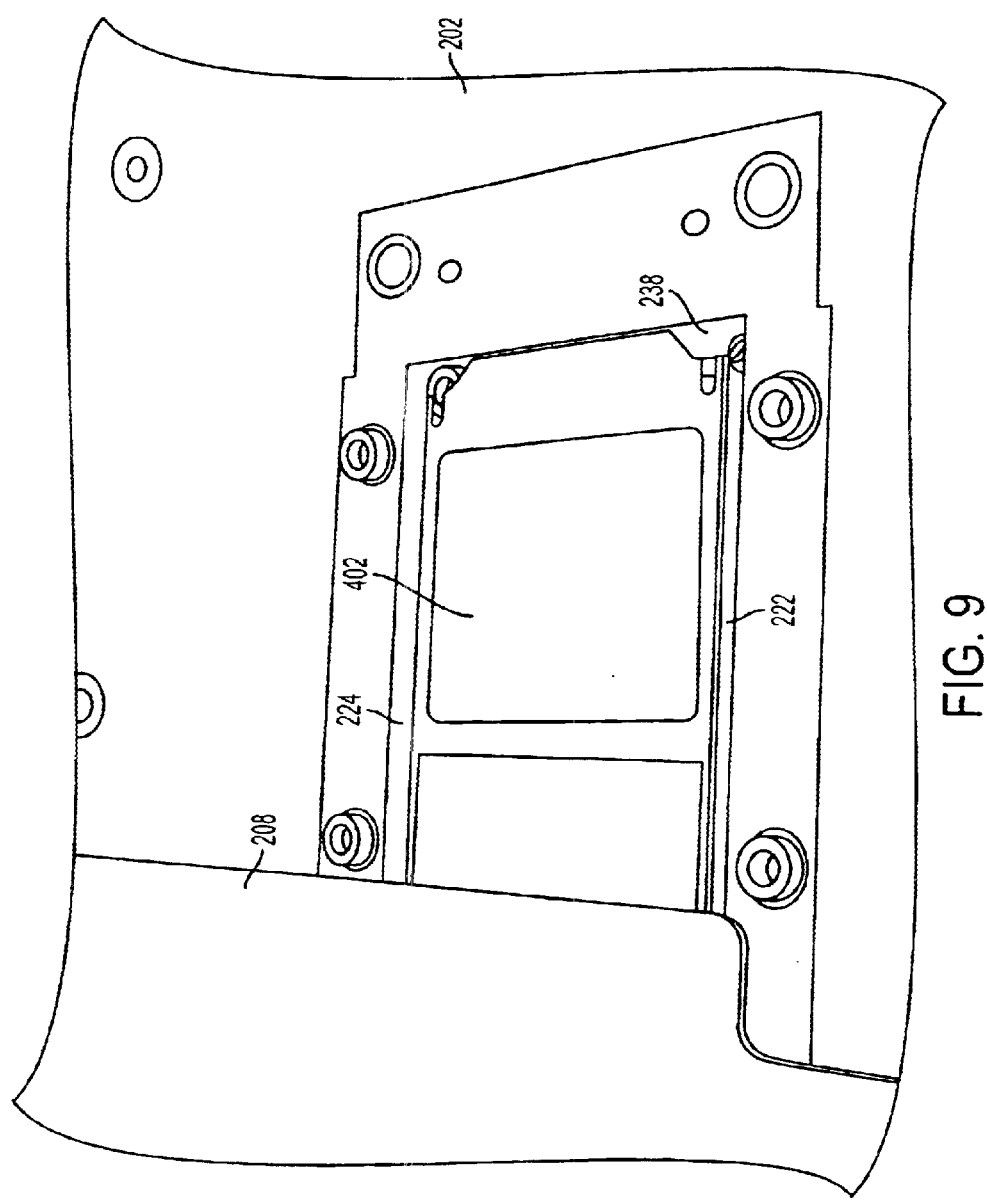
FIG. 9 is a bottom plan view of a shim assembly supporting a hardware module according to one embodiment of the present invention.

Two views of the bottom of the printed circuit board with an attached shim assembly, both without an inserted hardware module and with an inserted hardware module, are presented in FIGS. 8 and 9, respectively. Focusing on FIG. 8, the underside of both the printed circuit board 202 and chassis 208 reveals multiple screw structures 702 used to attach the shim assembly, including the left side rail 224, right side rail 222 and daughtercard 238, to the printed circuit board 202. The shim assembly 222, 224 and 238 runs along the three sides of the slot 214 in the printed circuit board 202 to support a hardware module. When the hardware module 402 is inserted into the slot 214, the shim assembly 222, 224 and 238 supports the hardware module 402, allowing it to lie flush with the bottom of the printed circuit board 202 as presented in FIG. 9.

Figure 10:
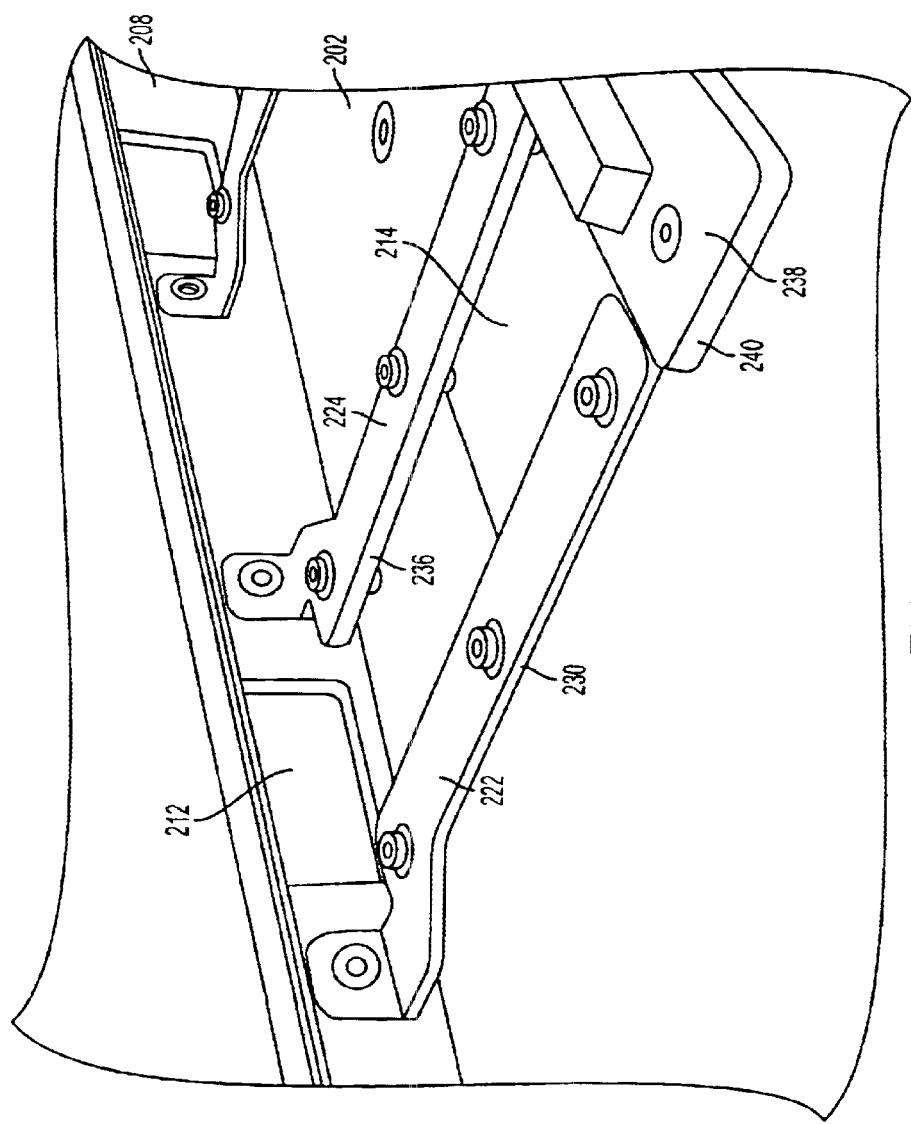
FIG. 10 is a reverse top perspective view of a shim assembly for supporting a hardware module according to one embodiment of the present invention.

FIG. 10 presents a reverse perspective view of the shim assembly looking towards the chassis 208. The shim assembly 222, 224 and 238 is attached to the printed circuit board 202 in a configuration generally conforming to the shape of the slot 214 in the printed circuit board 202. As described throughout, the shim assembly 222, 224 and 238 supports a hardware module by filling any gap between the hardware module and the printed circuit board 202. When the hardware module is inserted into the slot 214 through the opening 212 in the chassis 208, the side edges 230, 236 and 240 of the shim assembly 222, 224 and 238, respectively, are sufficiently thick to occupy any gaps between the printed circuit board 202 and the hardware module. Accordingly, embodiments of the invention provide for shim assemblies in which the side edges of a given shim assembly, e.g., the edge 236 of the left side rail 224, are of a thickness commensurate with a given gap between a hardware module and the printed circuit board.

Figure 11:
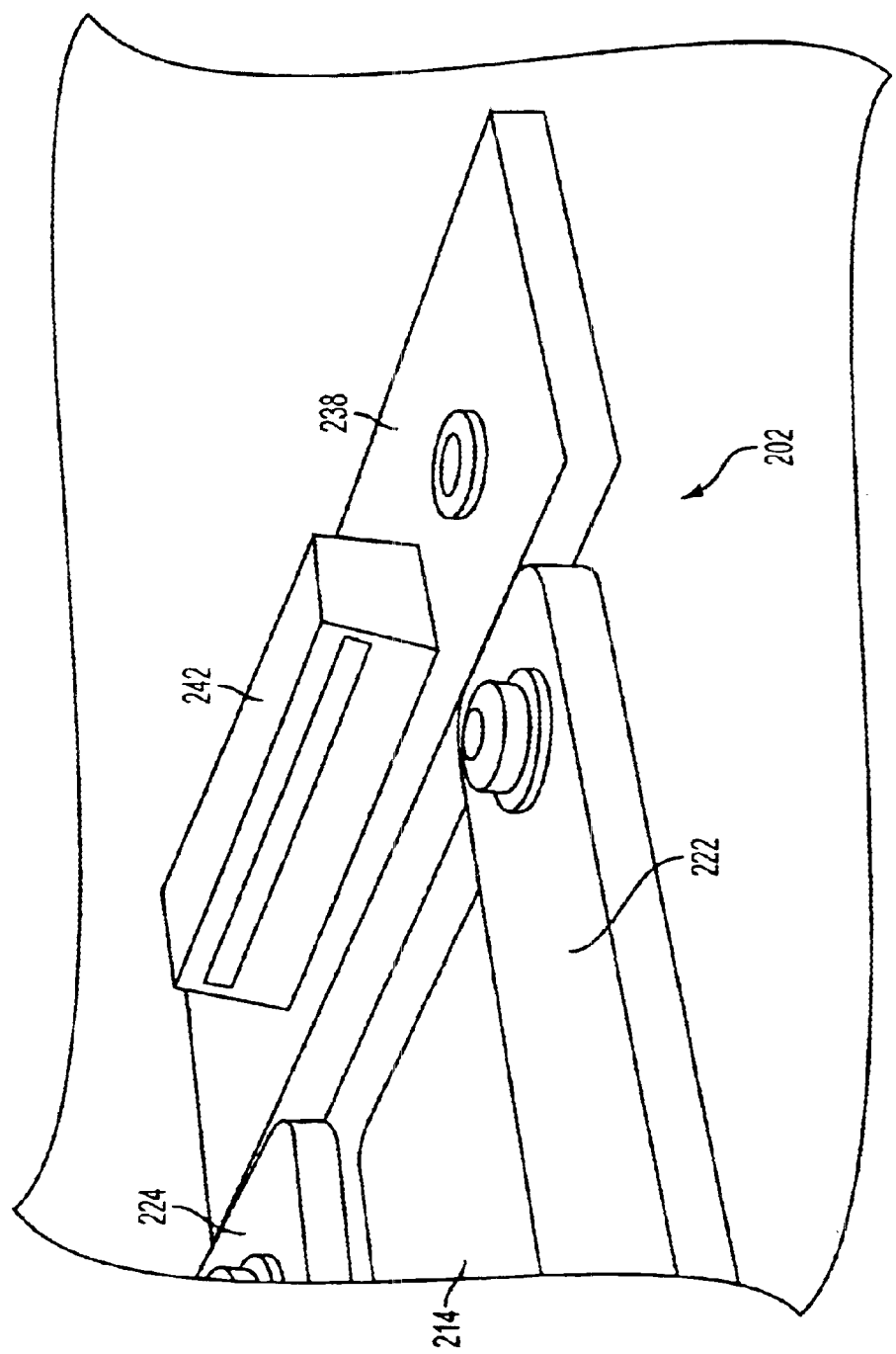
FIG. 11 is a top zoom view of a shim assembly for supporting a hardware module according to one embodiment of the present invention.

FIG. 11 presents a zoomed perspective view of the tangent of the daughtercard and side rails of a shim assembly according to the present invention. The shim assembly 222, 224 and 238 is shown attached to the printed circuit board 202 in greater detail. The two side rails 222 and 224 are attached to the printed circuit board and meet the daughtercard 238 at the distal end of opening of the slot 214, as shown previously, for example, in the embodiment of FIG. 10. The side rails, 222 and 224, and daughtercard 238 of the shim assembly are of a sufficient thickness to fill any gaps between the hardware module and the printed circuit board 202. Depending on the configuration of the hardware module, the daughtercard 238 and side rails 222 and 224 may be of disparate thickness, such as to accommodate irregularly shaped hardware components or an irregularly placed electrical interface with which the socket 242 must achieve a connection.

Although most illustrations of embodiments of the invention have depicted the shim assembly as constructed from a number of parts, other embodiments of the invention contemplate a unified shim assembly whereby the daughtercard and rails are formed from a single continuous piece of material. For example, where the shim assembly is constructed of plastic, the shim assembly may be constructed of a single piece of plastic in a shape that generally conforms to the shape of the slot in the printed circuit board with a socket located on the piece of plastic. When the hardware module is inserted into the slot, the socket is aligned to meet an electrical interface on the hardware module.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A shim assembly for supporting a hardware module, a bottom side of the shim assembly attached to a top side of a printed circuit board and generally conforming to the shape of a slot in the printed circuit board into which the hardware module is inserted, the shim assembly sufficiently thick to fill a gap between the hardware module and the top side of the printed circuit board such that the hardware module does not materially extend past a bottom side of the printed circuit board when inserted in the slot.

2. The shim assembly of claim 1 comprising means for attaching the shim assembly to the printed circuit board.

3. The shim assembly of claim 2 wherein the connecting means comprises an adhesive.

4. The shim assembly of claim 2 wherein the connecting means comprises one or more screws.

5. The shim assembly of claim 1 wherein the shim assembly is constructed of a non-conducive material.

6. The shim assembly of claim 1 comprising a socket attached to a top side of the shim assembly.

7. The shim assembly of claim 6 wherein the socket is positioned such that an electrical interface on the hardware module is aligned with the socket.

8. The shim assembly of claim 6 wherein the socket comprises electrical circuitry in connection with a circuit on the printed circuit board to provide a communication pathway for electrical signals to pass from the hardware module to a circuit on the printed circuit board via the socket.

9. A printed circuit board comprising a plurality of slots, each slot configured to accept a hardware module, and a plurality of shim assemblies, a bottom side of a given shim assembly attached to a top side of the printed circuit board and generally conforming to the shape of a given slot in the printed circuit board into which a hardware module is inserted, the given shim assembly sufficiently thick to fill a gap between the hardware module and the top side of the printed circuit board such that the hardware module does not materially extend past a bottom side of the printed circuit board when inserted in a given slot.

10. The shim assembly of claim 9 wherein each of the plurality of shim assemblies is of a disparate thickness, each of the plurality of shim assemblies sufficiently thick to fill a gap between a given hardware module and the top side of the printed circuit board such that the given hardware module does not materially extend past the bottom of the printed circuit board.

11. The shim assembly of claim 10 comprising a plurality of sockets, a given one of the sockets attached to a top side of a given one of the plurality shim assemblies.

12. The shim assembly of claim 10 wherein each of the plurality of sockets is positioned such that an electrical interface on a given hardware module is aligned with the socket.

13. A shim assembly for supporting a hardware module, the shim assembly attached to a top side of a printed circuit board, the printed circuit board having a slot with an opening located along a first side of the printed circuit board to receive a hardware module, the shim assembly comprising:

a first rail attached to the top side of the printed circuit board along a first side of the slot that is perpendicular to the opening;

a second rail attached to the top side of the printed circuit board along a second side of the slot that is perpendicular to the opening; and a daughtercard attached to the top side of the printed circuit board along a third side of the slot that is parallel to the opening;

wherein the first rail, second rail and daughtercard are sufficiently thick to fill a gap between the hardware module and the top side of the printed circuit board such that the hardware module does not materially extend past a bottom side of the printed circuit board when inserted in the slot.

14. The shim assembly of claim 13 comprising a socket attached to the daughtercard on a side of the daughtercard that is opposite to the side attached to the printed circuit board.

15. The shim assembly of claim 14 wherein the socket is positioned such that an electrical interface on the hardware module is aligned with the socket.

16. The shim assembly of claim 14 wherein the socket comprises electrical circuitry in connection with a circuit on the printed circuit board to provide a communication pathway for an electrical signal to pass from the hardware module to a circuit on the printed circuit board via the socket.

17. A shim assembly for supporting a hardware module, the shim assembly attached to a top side of a printed circuit board, the printed circuit board comprising a slot with an opening along a first side of the printed circuit board, a first inner edge parallel to the first side of the printed circuit board to receive a hardware module, a chassis perpendicular to the plane of the top side of the printed circuit board having an opening along a front edge forming an edge of the slot distal from the first inner edge of the slot, the shim assembly comprising:

a first and second rail sufficiently thick to fill a gap between the hardware module and the top side of the printed circuit board such that the hardware module does not materially extend past a bottom side of the printed circuit board when inserted in the slot, the first and second rail attached to the top side of the printed circuit board along a first and second side of the slot that is perpendicular to the opening, the first and second rail attached to the chassis; and a daughtercard, sufficiently thick to fill a gap between the hardware module and the top side of the printed circuit board such that the hardware module does not materially extend past a bottom side of the printed circuit board when inserted in the slot, the daughtercard attached to the top side of the printed circuit board along the first inner edge of the printed circuit board.

18. The shim assembly of claim 17 comprising a socket attached to the daughtercard on a side of the daughtercard that is opposite to the side attached to the printed circuit board.

19. The shim assembly of claim 18 wherein the socket is positioned such that an electrical interface on the hardware module is aligned with the socket.

20. The shim assembly of claim 18 wherein the socket comprises electrical circuitry in connection with a circuit on the printed circuit board to provide a communication pathway for an electrical signal to pass from the hardware module to a circuit on the printed circuit board via the socket.

21. The shim assembly of claim 17 comprising means for attaching the shim assembly to the printed circuit board.

22. The shim assembly of claim 21 wherein the connecting means comprises an adhesive.

23. The shim assembly of claim 21 wherein the connecting means comprises one or more screws.

24. The shim assembly of claim 17 wherein the shim assembly is constructed of a non-conducive material.

* * * * *